United States Patent [19]
Thomas

[11] Patent Number: 5,971,348
[45] Date of Patent: Oct. 26, 1999

[54] ADJUSTABLE STAND FOR A CANTILEVERED LOAD

[75] Inventor: Roy D. Thomas, Gaithersburg, Md.

[73] Assignee: Corning Incorporated, Corning, N.Y.

[21] Appl. No.: 08/915,217

[22] Filed: Aug. 20, 1997

Related U.S. Application Data

[60] Provisional application No. 60/027,508, Oct. 3, 1996.

[51] Int. Cl.⁶ .................................................. F16M 13/00
[52] U.S. Cl. .................. 248/651; 248/124.1; 248/125.2; 248/287.1; 248/661; 248/662; 248/669
[58] Field of Search .............................. 248/124.1, 125.1, 248/125.2, 285.1, 295.11, 298.1, 287.1, 646, 651, 656, 657, 660, 661, 662, 664, 669; 384/49

[56] References Cited

U.S. PATENT DOCUMENTS

| | | | |
|---|---|---|---|
| 1,117,917 | 11/1914 | Schoenky | 248/662 X |
| 1,562,650 | 11/1925 | Meyer | 248/124.1 X |
| 2,291,999 | 8/1942 | Wilson et al. | 248/656 |
| 2,340,572 | 2/1944 | Smith | 248/661 |
| 2,842,026 | 7/1958 | Reese et al. | 248/669 X |
| 3,464,655 | 9/1969 | Schuman . | |
| 3,533,583 | 10/1970 | Azim | 248/125.2 |
| 3,608,462 | 9/1971 | Groshong . | |
| 3,806,395 | 4/1974 | French . | |
| 3,862,734 | 1/1975 | Buchin et al. | 248/125.2 |
| 4,320,887 | 3/1982 | Destree | 248/651 |
| 4,557,454 | 12/1985 | Urella . | |
| 4,655,426 | 4/1987 | Dulong et al. . | |
| 4,750,970 | 6/1988 | Malosh . | |
| 4,807,272 | 2/1989 | Buenther et al. | 248/125.1 |
| 5,224,429 | 7/1993 | Borgman et al. . | |
| 5,337,678 | 8/1994 | Grout . | |
| 5,393,144 | 2/1995 | Higuchi | 384/49 X |
| 5,495,811 | 3/1996 | Carson et al. . | |

*Primary Examiner*—Derek J. Berger
*Attorney, Agent, or Firm*—Angela N. Nwaneri; Patrick P. Pacella; Anca C. Gheorghiu

[57] ABSTRACT

An adjustable stand is disclosed for raising and lowering a cantilevered load while reducing friction and preventing binding in the raising and lowering mechanism. A carriage for a cantilever arm, carrying the cantilevered load, rolls along a pair of parallel linear shafts by means of ball bearing bushings thus providing linear non-binding rolling motion therealong. In addition, an air clamp is provided for lockably positioning the cantilevered load in a desired rotational orientation with respect to the cantilever arm.

8 Claims, 5 Drawing Sheets

ADJUSTABLE STAND FOR A CANTILEVERED LOAD

This application claims the benefit of U.S. Provisional Application No. 60/027,508 filed Oct. 3, 1996, entitled ADJUSTABLE STAND FOR A CANTILEVERED LOAD, by Roy D. Thomas.

FIELD OF THE INVENTION

The present invention relates to a height-adjustable stand or support structure, and more particularly to an improved system for raising and lowering a cantilevered load of up to 500 pounds or more while preventing binding and reducing friction. In addition, a unique locking mechanism is disclosed for lockably positioning the load on a cantilever arm.

BACKGROUND OF THE INVENTION

Numerous support stands for raising and lowering a load are known in the prior art. Some manually raise and lower the load by means of a rack and pinion as disclosed in U.S. Pat. Nos. 3,464,655 and 3,806,395, while others as shown in U.S. Pat. Nos. 4,655,426 and 5,337,678 utilize a manually operated screw jack to raise and lower the load. However, electro-mechanical actuators for raising and lowering loads are disclosed in U.S. Pat. Nos. 3,608,462; 4,557,454; 5,224,429 and 5,495,811, whereas U.S. Pat. No. 4,750,970 discloses an electrically operated rack and pinion for moving a framework back and forth in a horizontal direction.

Since most of the loads disclosed in the prior art were relatively light or were positioned immediately adjacent the raising and lowering column, the problems of a heavy cantilevered load and the locking of such load in a specific position on a cantilever arm were not fully recognized or properly dealt with. That is, as shown in the cited prior art, either multiple telescoping support columns or large heavy plates with long rollers on opposite sides thereof were utilized to compensate for the inherent binding effect produced with a cantilevered load. Further once the cantilevered load were raised on a cantilever arm, no convenient mechanism was available for locking the load in a desired rotational position on such arm.

Accordingly, it is an object of the present invention to provide an improved apparatus for raising and lowering a cantilevered load which prevents the cantilever arm from binding on the support post while reducing friction within the operating mechanism.

A further object has been to provide a unique remote controlled locking mechanism for locking a load in a desired position on a raised cantilever arm.

SUMMARY OF THE INVENTION

In its simplest form, the invention sets forth a compact apparatus for raising and lowering a cantilever arm, capable of carrying loads of 500 pounds or greater, on a support post, while preventing the arm from binding during its movement vertically along the support post. An electro-mechanical actuator is utilized to move the cantilever arm along a given vertical extent of the support post by means of a linear motion system secured to the support post. Further, an air clamp is secured to the cantilever arm for lockable positioning a load carried thereby in a desired rotational orientation with respect to the arm.

DESCRIPTION OF THE PREFERRED EMBODIMENTS

Figure 1:
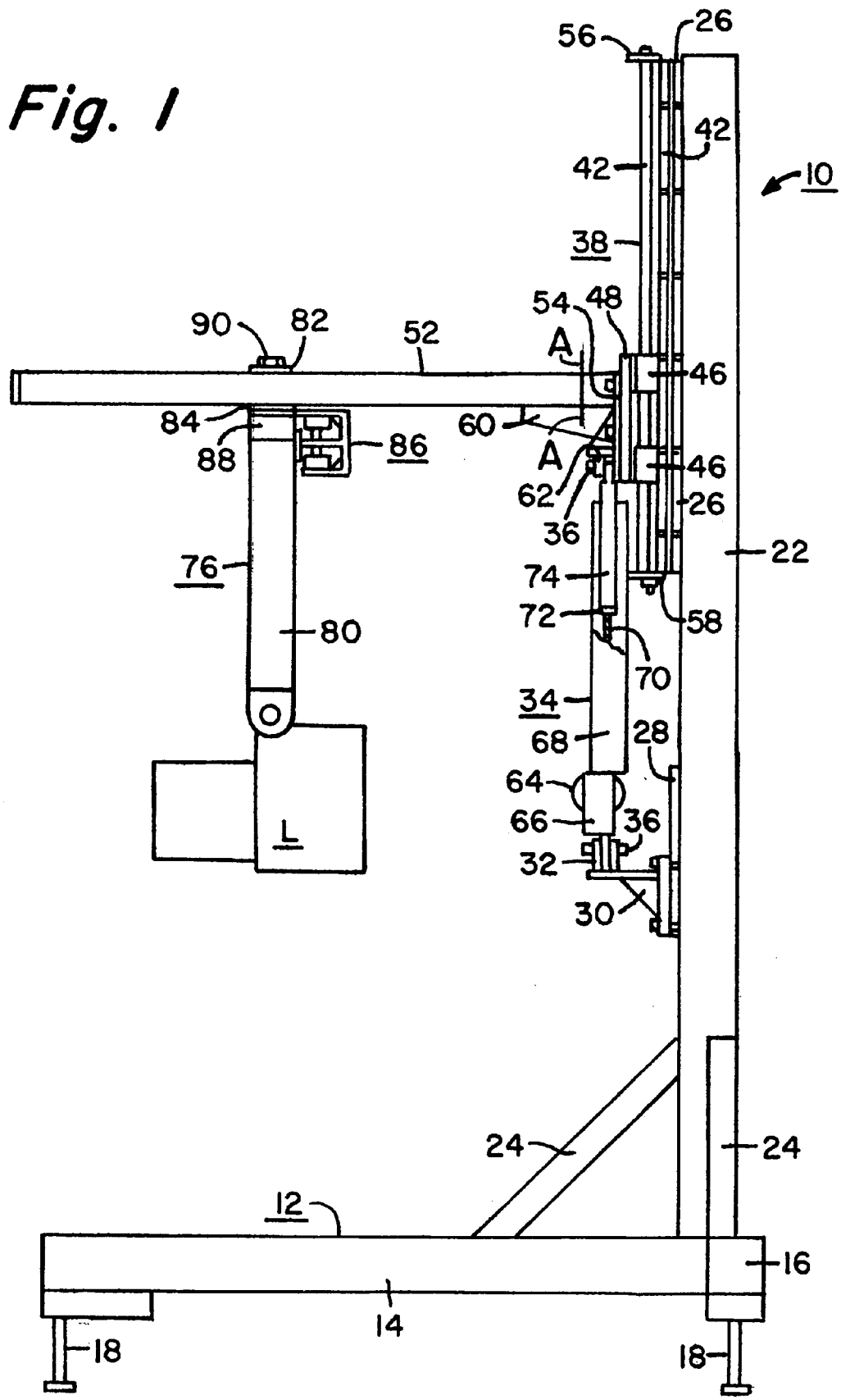
FIG. 1 is a side elevational view of the preferred embodiment of an adjustable stand for raising and lowering a cantilevered load.
Figure 2:
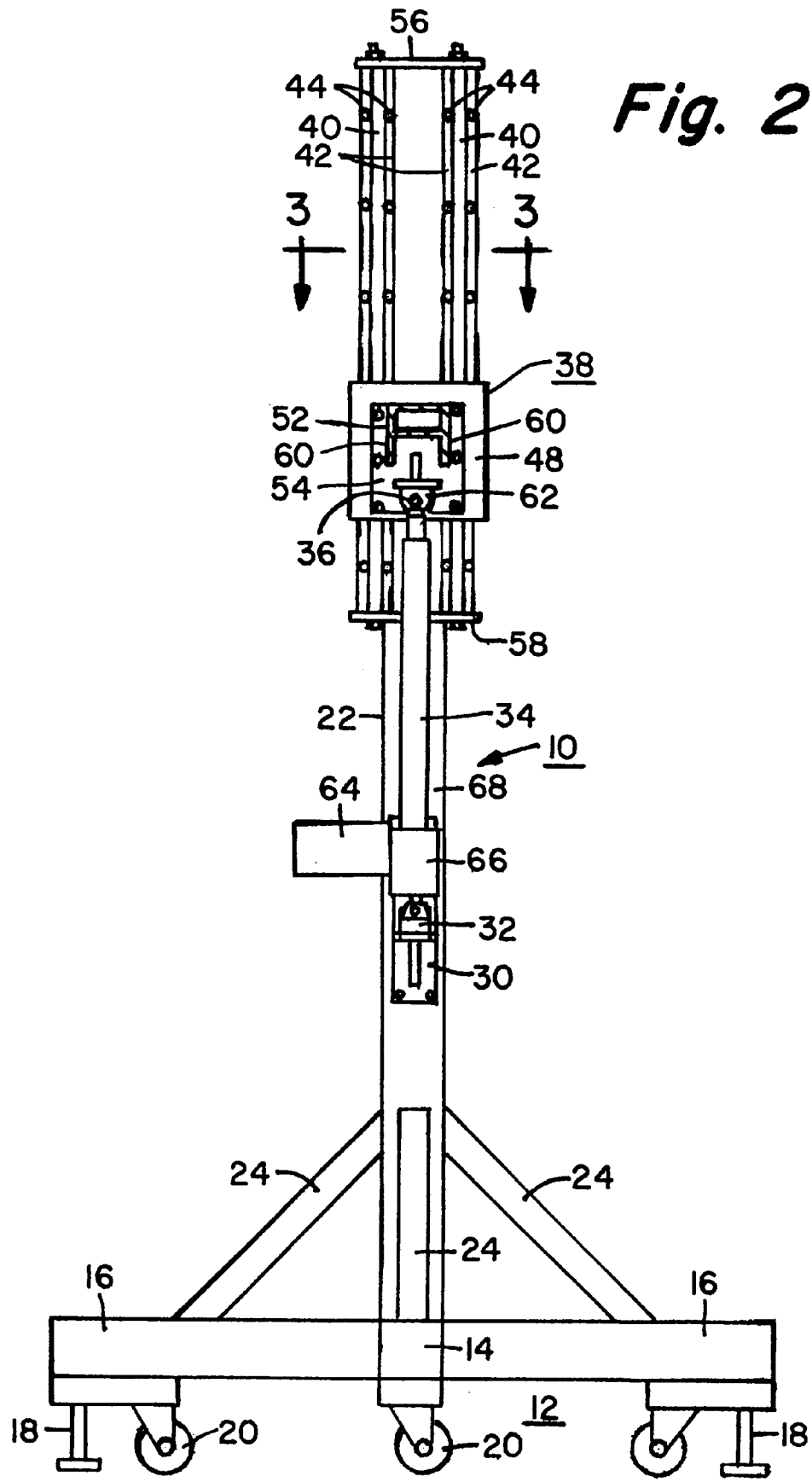
FIG. 2 is a front elevational view thereof, with the arm removed along line A—A of FIG. 1.

Referring now to the drawings and particularly FIGS. 1 and 2, an adjustable stand 10 for raising and lowering a cantilevered load L, is shown having a T-shaped base 12 with a front leg 14 and two back legs 16. The base 12 may be provided with jacks 18 for supporting and leveling the base as well as castors 20 for facilitating mobility of the adjustable stand 10.

Figure 3:
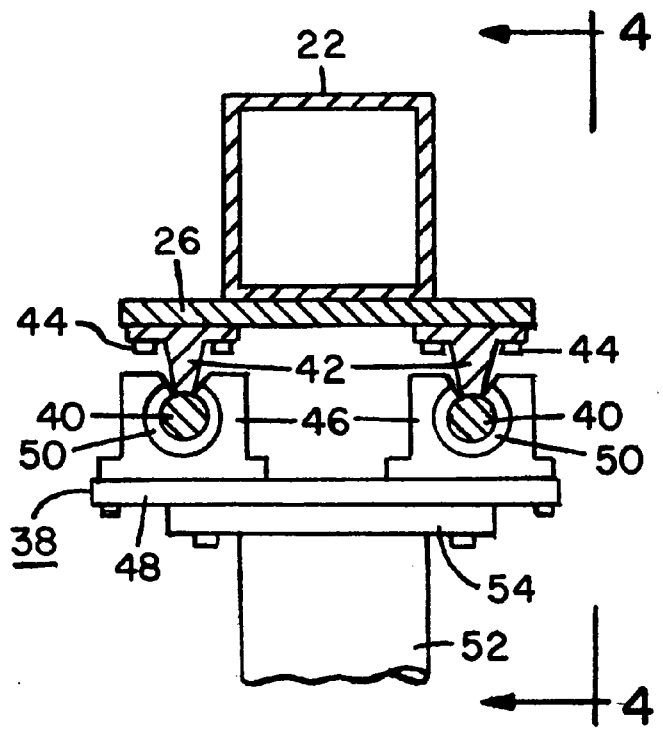
FIG. 3 is a sectional view taken along line 3—3 of FIG. 2.
Figure 4:
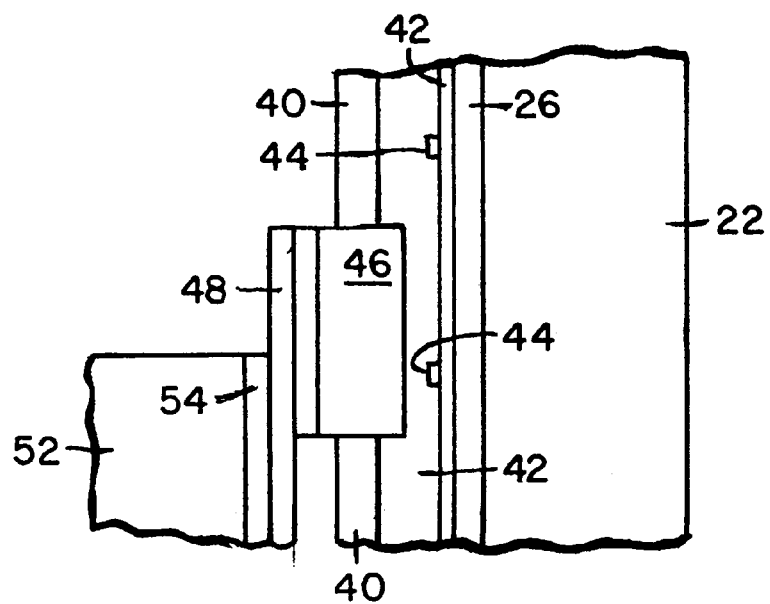
FIG. 4 is a fragmental elevational view taken along line 4—4 of FIG. 3.

An upright post or column 22 is secured to the central back portion of the T-shaped base 12 so as to be vertical with respect to the base. A plurality of braces 24, welded at opposite ends to the base 12 and the post 22, support the rigidity and positionment of the post on the base. A front surface of the post 22 is provided with an elongated upper support plate 26, also shown in FIGS. 3 and 4, and a lower support plate 28. The support plates may be welded to the front surface of the upright column or post 22. A lower actuator mounting 30 is secured to the lower support plate 28 such as by bolts. The lower actuator mounting 30 has a clevis portion 32, offset from the post 22, for pivotally mounting the lower end of an electro-mechanical actuator assembly 34, to be described hereinafter, by means of a conventional bolt and nut arrangement 36.

The upper elongated support plate 26 is provided with a linear motion system assembly 38, such as manufactured by Thomson Industries, Inc. of Port Washington, N.Y. The linear motion assembly 38 includes a pair of parallel accurately machined case hardened steel shafts 40, welded to tracks 42 which are accurately aligned and fastened to upper elongated support plate 26, such as by screws 44. A pair of pillow blocks 46 for each shaft 40 are accurately aligned on a carriage plate 48, and accordingly the carriage 48 is provided with four such pillow blocks with transverse pairs being aligned and longitudinal pairs being aligned. Each pillow block 46 is provided with ball bearing type bushings 50 which cooperatively engage a major portion of the circumference of the steel shafts 40. A cantilever arm 52 is secured to the carriage 48 by means of a mounting plate portion 54 which is bolted to the carriage plate. The linear motion assembly 38 is provided with an upper stop plate 56 and a lower stop plate 58.

The mounting plate portion 54 for the cantilever arm 52 includes a pair of support braces 60 and an upper actuator mounting clevis portion 62. A bolt and nut 36 pivotally mount the upper portion of the electro-mechanical actuator assembly 34 to the clevis portion 62 of the mounting for cantilever arm 52.

The electro-mechanical actuator assembly 34 is preferably an electric motor driven screw jack arrangement such as the 115 volt AC series 6905 electro-mechanical actuators manufactured by the Duff-Norton Company of Charlotte, N.C. As shown more particularly in FIG. 1, the actuator assembly 34 includes an electric motor 64, a gear box 66, and an outer tube 68, housing a screw shaft 70 which cooperates with a nut 72 secured to a vertically moveable inner tube 74. The moveable tube 74 has an opening at its outer end pivotally connected to the upper actuator mounting clevis portion 62.

In operation, electric motor 64 is energized so as to rotate screw shaft 70 through gear box 66 and cooperate with the fixedly positioned nut 72, so as to raise or lower the vertically moveable inner tube 74 attached to the mounting for the cantilever arm 52. Accordingly, carriage 48, to which the cantilever arm 52 is attached, moves linearly upwardly and downwardly along the pair of parallel steel shafts 40 by means of the ball bearing type bushings 50 carried by pillow blocks 46 attached to the carriage 48.

In view of the fact that the bushing are supplied with ball bearings, the upward and downward motion of the carriage on the shafts 40 is a non-binding freely flowing rolling motion, rather than a somewhat binding and constricted sliding motion which is accomplished with typical sleeve bushings. Further, greater load capacity on the cantilever arm 52 is obtainable due to the self alignment of the ball bearings in the bushings along the parallel steel shafts, whereas sleeve bushings tend to wear non-uniformly under cantilevered loads. Further, the linear motion assembly 38 maintains the cantilever arm 52 in alignment with the actuator 34 while providing a virtually frictionless rolling mechanism for the cantilever arm to ride on as it glides upwardly and downwardly along post 22.

The concept of utilizing ball bearing type bushings which ride upon hardened steel shafts allows the actuator to raise and lower cantilevered loads of up to 500 pounds or more, while preventing binding and reducing friction as the carriage moves upwardly and downwardly along the steel shafts.

As shown in FIG. 1, once the cantilevered load L, carried by cantilever arm 52, is raised by the actuator assembly 34 and the linear motion assembly 38 to a desired position, it becomes virtually impossible to manually secure the load L in a desired rotational positionment with respect to the arm 52, without requiring the use of scaffolding or a ladder. The load L is suspended from the cantilever arm 52 by a U-shaped yoke assembly 76, having an upper crossbar 78, and a pair of downwardly extending arms 80 which allow the load L to be pivotally mounted therebetween. The U-shaped yoke assembly 76, is mounted for both pivotal and sliding movement on the cantilever arm 52.

Figure 5:
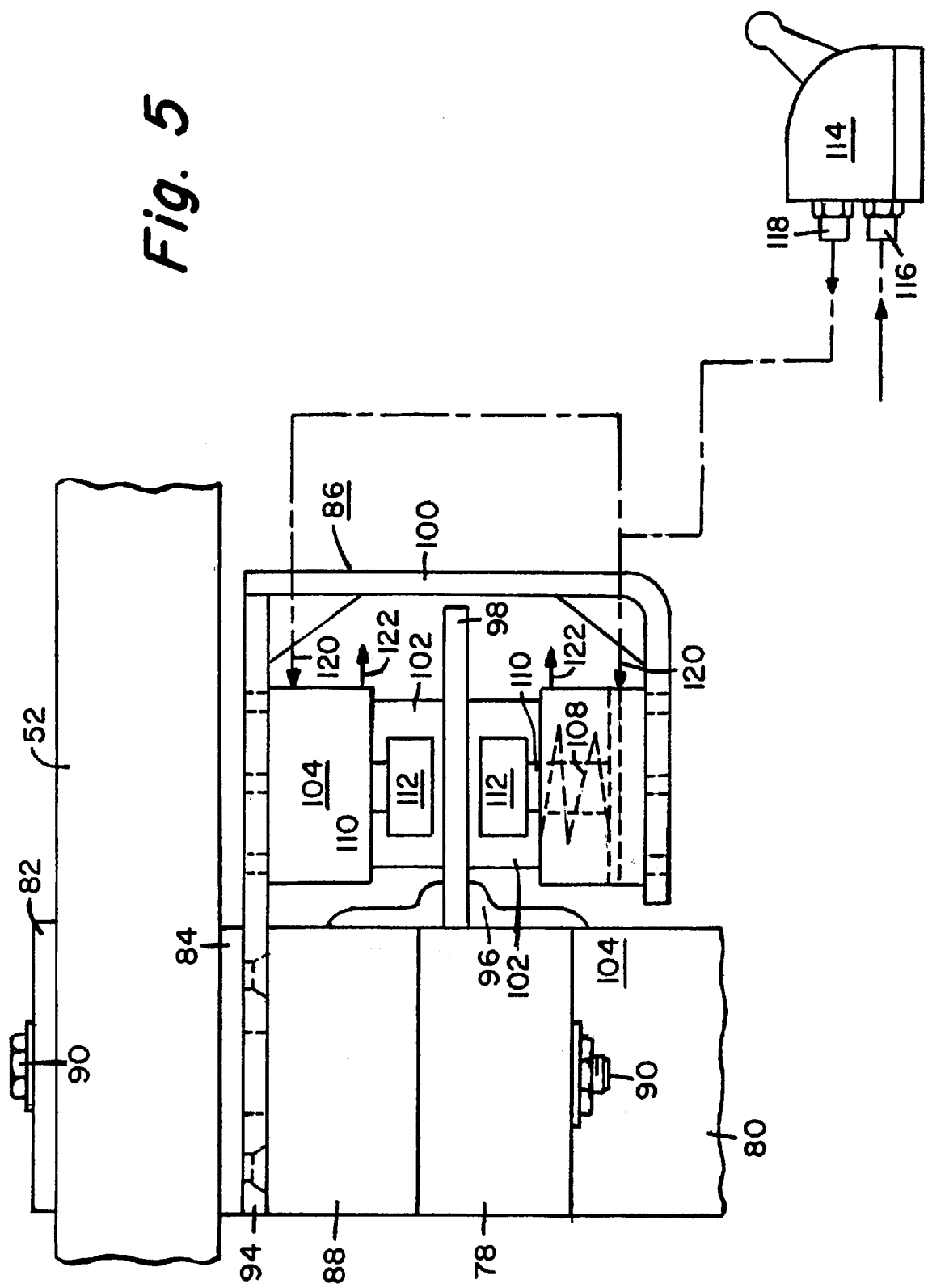
FIG. 5 is a somewhat schematic enlarged elevational view illustrating the clamping device shown in FIG. 1, and illustrating the pneumatic feed in phantom lines.

As shown in FIG. 5, an upper slide plate 82 is positioned on the upper surface of the cantilever arm 52, a lower slide plate 84 is positioned adjacent an under surface of the arm, a clamp assembly 86 is secured to the lower slide plate 84, and a spacer block 88 is positioned between the upper crossbar 78 and the mounting portion of the clamp assembly. A nut and bolt arrangement 90, extending through plates 82 and 84, spacer block 88 and upper crossbar member 78, pivotally mounts the U-shaped yoke assembly 76 on the cantilever arm 52.

Figure 6:
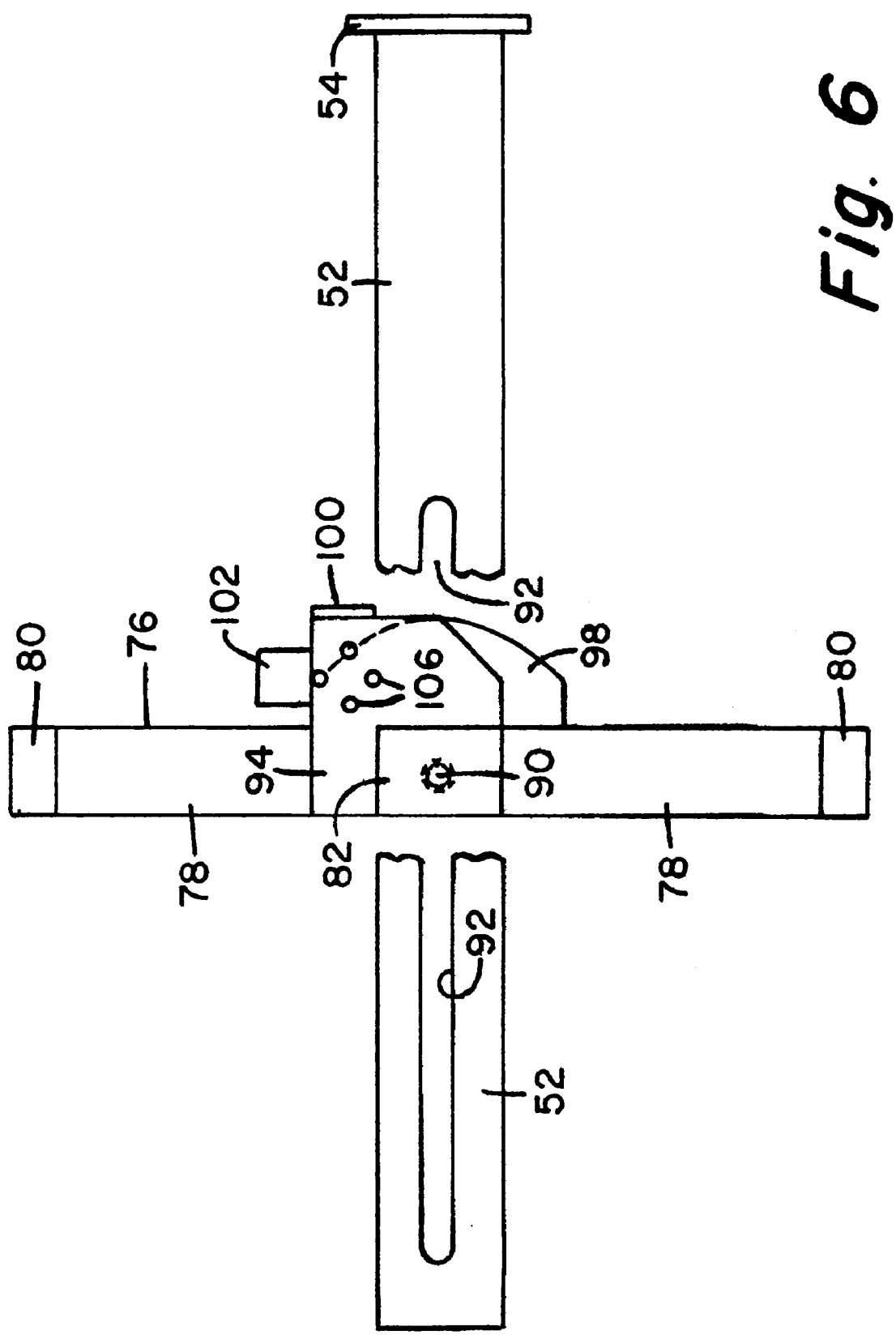
FIG. 6 is a plan view of the clamping device, but in smaller scale, and with the cantilever arm being broken away in the center to better show the clamping mechanism.

As shown in FIG. 6, a slot 92 formed in the cantilever arm 52, allows the nut and bolt arrangement 90 to slide longitudinally along the arm. Lower slide plate 84 is provided with a slot and keyway (not shown) relative to the bottom surface of the arm 52 such that the plate 84 is free to slide longitudinally along the arm with the mounting assembly, however, it is rotationally fixed with respect to the arm. Thus, the mounting bracket 94 of the clamp assembly 86 which is secured such as by cap screws to the lower slide plate 84, is also rotationally fixed with respect to arm 52. However, spacer block 88 is rotatable in unison with the upper crossbar 78 about the axis of the bolt 90. A clamp bracket 96 having a clamping plate 98 is secured to spacer block 88 and the upper crossbar 78 of the yoke assembly 76 so as to rotate in unison with such members.

The mounting bracket 94 of the clamp assembly 86 includes an L-shaped support member 100 forming a side and a bottom of the mounting bracket, and a C-shaped support member 102 forming a back portion of the mounting bracket. A pair of air cylinders 104 are positioned in vertically opposed relationship within the bracket 94 of the clamp assembly 86. Air cylinders 104 are secured to the mounting bracket 94 such as by screws 106, and are positioned within the mounting bracket on opposite sides of the clamping plate 98 of clamp bracket 96. Preferably, the air cylinders are of a single acting spring return cylinder with the piston rod in a normally retracted position, such as model FOS of the Bimba Company, Flat-1 Series.

As schematically shown in the lower air cylinder 104 of FIG. 5, a spring 108 normally urges the piston rod 110 in a retracted position such that a clamping shoe 112 thereon is retracted from the clamping plate 98. As shown by phantom lines in FIG. 5, a supply of compressed air enters a control 114, positioned remote from the clamp assembly 86, at 116 and exits at 118, being delivered to inlets 120 of the air cylinders 104. Accordingly, the pistons 110 are moved outwardly such that the clamping shoes 112 engage the clamping plate 98 to firmly position the rotational orientation of the yoke assembly 76 with respect to the cantilever arm 52. Upon releasing the pressure by controller 114, air is exhausted out of exhaust ports 122 and the spring 108 urges the piston into its retracted position so as to release the clamping shoes 112 from the clamping plate 98.

In operation, after the cantilever arm has been raised to its desired position by means of the electro-mechanical actuator assembly 34 and the linear motion assembly 38 as previously described, the U-shaped yoke assembly 76, carrying the desired load L which may be a bar code labeler mechanism, is manually slide along slot 92 to its desired longitudinal position on the arm 52 and then rotated about the axis of bolt 90 to a desired rotational positionment with respect to the arm 52.

Controller 114 is then activated to energize air cylinders 104 so that clamping shoes 112 tightly engage the clamping plate 98 attached to the U-shaped yoke assembly 76 so as to lockably position such assembly with a desired rotational orientation relative to the cantilever arm 52. Upon completion of the desired operation, the pressure in the cylinders 104 is relieved by controller 114, and air is exhausted out of exhaust ports 122 to allow spring 108 to retract the pistons 110 and accordingly the clamping shoes 112 from the plate 98, thus allowing free rotation of the yoke assembly as desired.

Although the now preferred embodiments of the invention have been disclosed with respect to an adjustable stand for use with a bar code labeler machine, it will be apparent to those skilled in the art that the stand has many uses and that various changes and modifications may be made thereto without departing from the spirit and the scope of the invention as set forth in the appended claims.

I claim:

1. An adjustable stand for raising and lowering a cantilevered load comprising:

a base portion, an upright portion secured to said base portion, a carriage, means for mounting said carriage for rolling movement along said upright portion, wherein said means for mounting includes a pair of parallel linear shafts mounted on said upright portion and roller means mounted on said carriage which engage each of said parallel shafts, a cantilever arm secured to said carriage, means for supporting a load on said cantilever arm, said means for supporting a load on said cantilever arm including means for rotating said load with respect to said arm, and means positioned on said means for supporting a load and operated at a position remote from said arm for locking said load in a desired rotational positionment with respect to said arm, said locking means including clamping means rotationally fixed with respect to said arm, and plate means mounted on said means for supporting a load for rotation therewith and positioned for operative engagement by said clamping means, said clamping means including a pair of air cylinders positioned on opposite sides of said plate means, and control means positioned remote from said clamping means for energizing said air cylinders to engage said plate means and lockably position said load in desired rotational orientation with respect to said arm, and actuator means for moving said cantilever arm along a given extent of said upright portion.

2. An adjustable stand for raising and lowering a cantilevered load as defined in claim 1 wherein a lower actuator mounting bracket is secured to said upright portion, an upper mounting portion is secured to said cantilever arm, and said actuator means includes an electro-mechanical screw jack mounted between said lower bracket and said upper mounting portion.

3. An adjustable stand for raising and lowering a cantilevered load comprising:

a base portion an upright portion secured to said base portion, a carriage, means for mounting said carriage for rolling movement along said upright portion, wherein said means for mounting includes a pair of parallel linear shafts mounted on said upright portion and roller means mounted on said carriage which engage each of said parallel shafts, a cantilever arm secured to said carriage, means for supporting a load on said cantilever arm, actuator means for moving said cantilever arm along a given extent of said upright portion, and wherein said roller means is a plurality of ball bearing bushings mounted on said carriage such that the plurality of ball bearing bushings engage said pair of linear shafts, wherein transverse pairs of the ball bearing bushings are aligned and longitudinal pairs of the bushings are aligned to cooperate with said pair of parallel linear shafts, said actuator means being an electro-mechanical screw jack connected at its lower end to said upright portion and at its upper end to said cantilever arm for causing said ball bearing bushing to roll on said shafts as the screw jack moves the arm along the upright portion.

4. An adjustable stand for raising and lowering a cantilevered load as defined in claim 3 wherein said means for supporting a load is rotatable with respect to said cantilever arm, and wherein a clamping means is connected to said means for supporting a load for lockably clamping said load in a desired rotational position on said cantilever arm.

5. An adjustable stand for raising and lowering a cantilevered load comprising, a base portion, an upright post secured to said base portion, a pair of parallel spaced-apart linear shafts secured to one surface of said upright post, a movable carriage assembly, said carriage assembly including a plate member and at least two pairs of ball bearing bushings mounted on said plate member, such that the ball bearing bushings engage said pair of linear shafts wherein the ball bearing bushings across from each other are in transverse alignment and the ball bearing bushings in linear alignment are in longitudinal alignment to rollably cooperate with said pair of parallel linear shafts, a cantilever arm secured to said carriage assembly, rotatable means for supporting a load on said cantilever arm, and electro-mechanical screw jack means, connected at its lower end to said upright post and at its upper end to said cantilever arm, for raising and lowering said arm along said post by rolling said carriage assembly along said linear shafts by means of said ball bearing bushings.

6. An adjustable stand for raising and lowering a cantilevered load as defined in claim 5 including air cylinder clamping means connected to said supporting means for lockably clamping said load in a desired rotational positionment with respect to said cantilever arm.

7. An adjustable stand for raising and lowering a cantilevered load as defined in claim 6 wherein said ciamping means includes a pair of opposed air cylinders, each cylinder of said pair of cylinders including a clamping shoe attached to a piston, mounted so as to be rotationally fixed with respect to said cantilever arm, and a clamping plate mounted on said supporting means between said opposed air cylinders for rotation with said supporting means, and control means for energizing said air cylinders to clamp on said clamping plate and fixedly position said load in a desired rotation with respect to said cantilever arm.

8. An adjustable stand for raising and lowering a cantilevered load as defined in claim 7 wherein said support means includes means for moving said load longitudinally along said cantilever arm.

* * * * *